(12) United States Patent
Hayashi

(10) Patent No.: US 10,367,973 B2
(45) Date of Patent: Jul. 30, 2019

(54) IMAGE FORMING APPARATUS, AND CONTROL METHOD OF IMAGE FORMING APPARATUS

(71) Applicant: CANON KABUSHIKI KAISHA, Tokyo (JP)

(72) Inventor: Tomonori Hayashi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/897,064

(22) Filed: Feb. 14, 2018

(65) Prior Publication Data

US 2018/0176418 A1 Jun. 21, 2018

Related U.S. Application Data

(63) Continuation of application No. 14/747,105, filed on Jun. 23, 2015, now Pat. No. 9,936,101.

(30) Foreign Application Priority Data

Jun. 24, 2014 (JP) ................................ 2014-129444

(51) Int. Cl.
*H04N 1/00* (2006.01)
*H04N 1/44* (2006.01)

(52) U.S. Cl.
CPC ......... *H04N 1/4426* (2013.01); *H04N 1/4406* (2013.01)

(58) Field of Classification Search
CPC ........................ H04N 1/4426; H04N 1/4406
See application file for complete search history.

(56) References Cited

U.S. PATENT DOCUMENTS

2005/0265744 A1* 12/2005 Uruta .................... G03G 15/50
399/80
2010/0084200 A1* 4/2010 Juan-Castellanos ... G01G 19/40
177/25.15

FOREIGN PATENT DOCUMENTS

| JP | 2006-026972 A | 2/2006 |
|---|---|---|
| JP | 2011-123824 A | 6/2011 |
| JP | 2013-061770 A | 4/2013 |
| JP | 2014-078928 A | 5/2014 |

* cited by examiner

*Primary Examiner* — Iriana Cruz
(74) *Attorney, Agent, or Firm* — Canon U.S.A., Inc. I.P. Division

(57) ABSTRACT

An image forming apparatus includes a first setting unit that sets a setting value of individual setting information for a login user, and a second setting unit that sets, in a case where a logout request is received, a setting value of common setting information, wherein the second setting unit omits, in a case where a login request of a new user is received while the user is logged in, a process for setting the setting value of the common setting information based on the common setting information, and the first setting unit sets a setting value of individual setting information for the new user based on individual setting information associated with user identification information for identifying the new user.

20 Claims, 11 Drawing Sheets

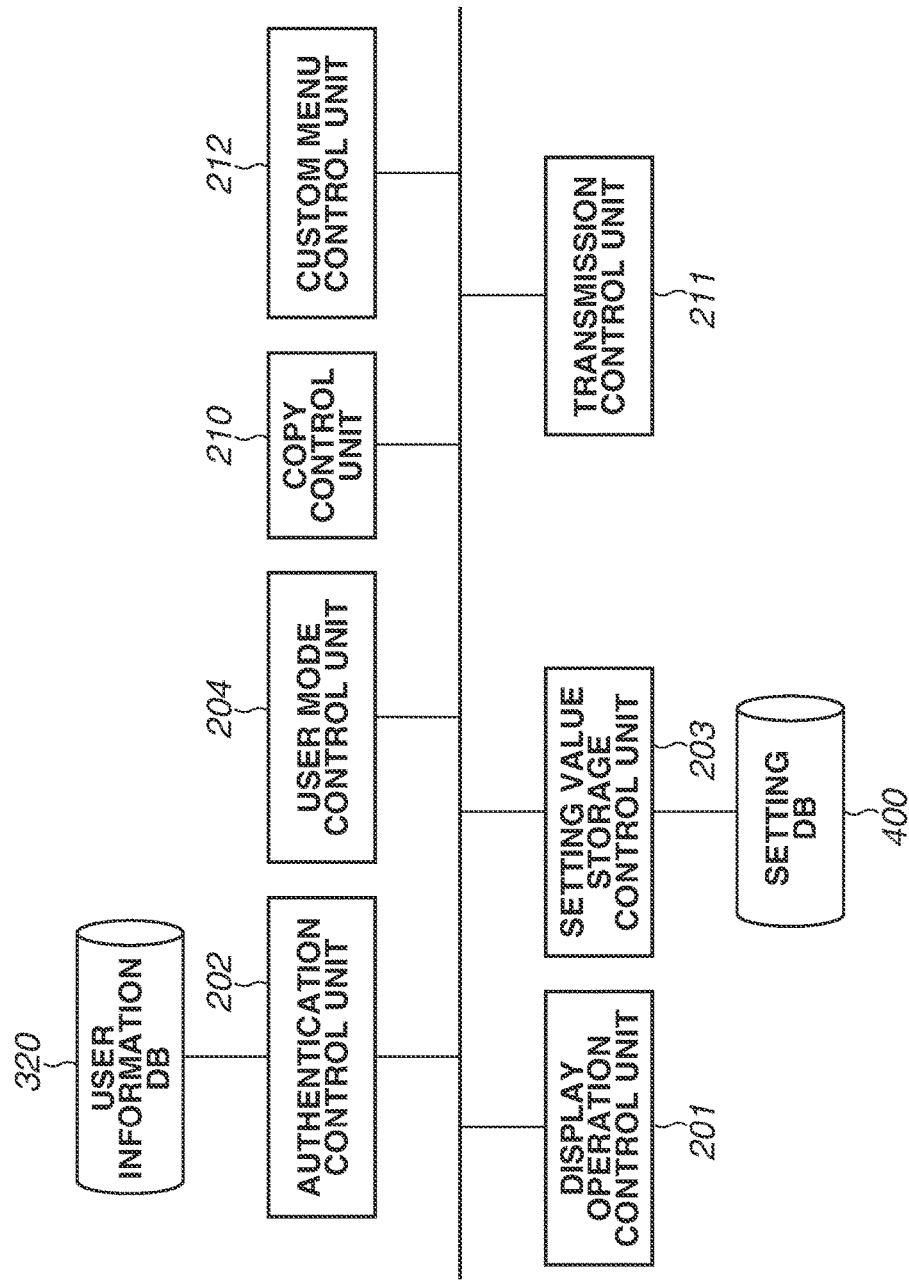

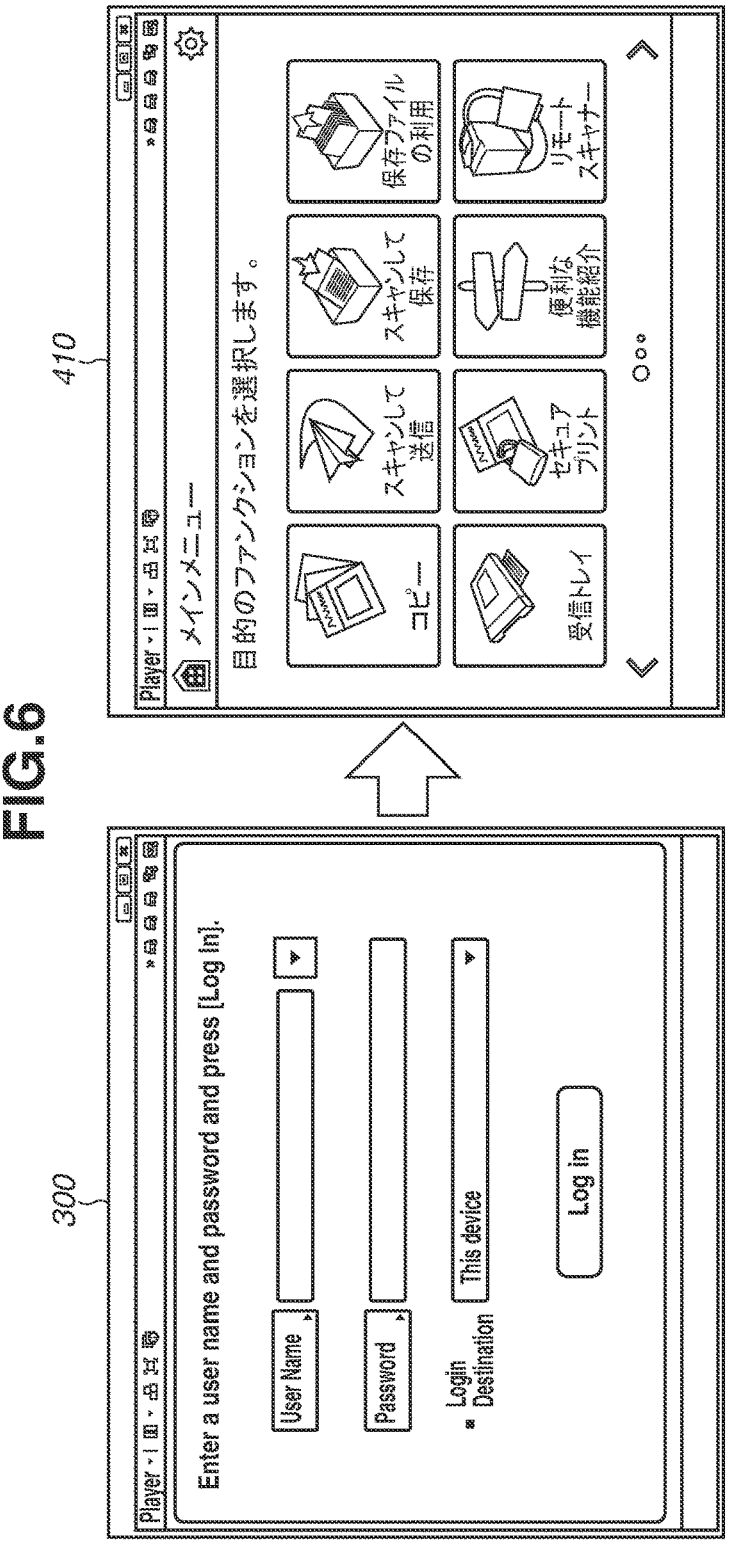

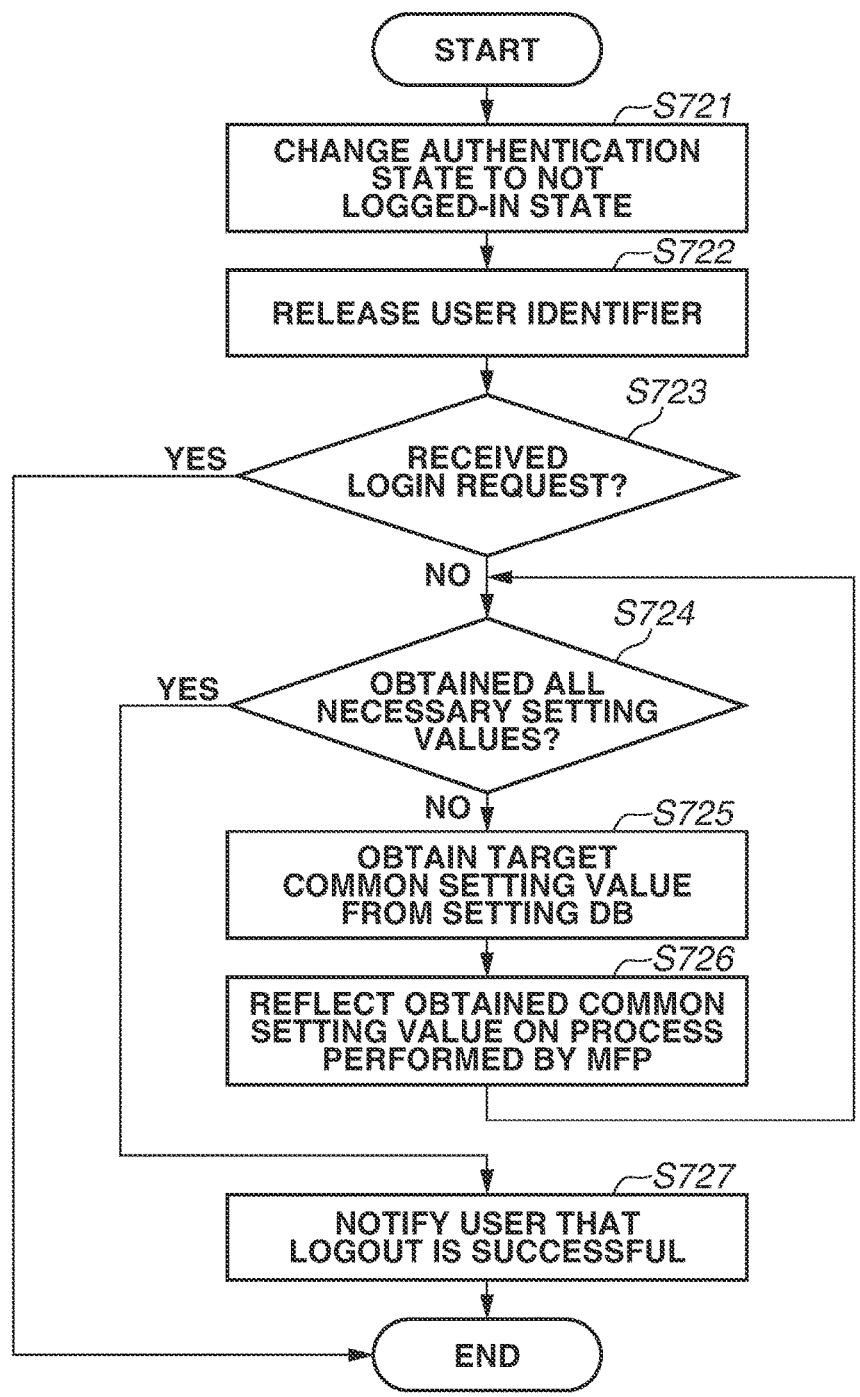

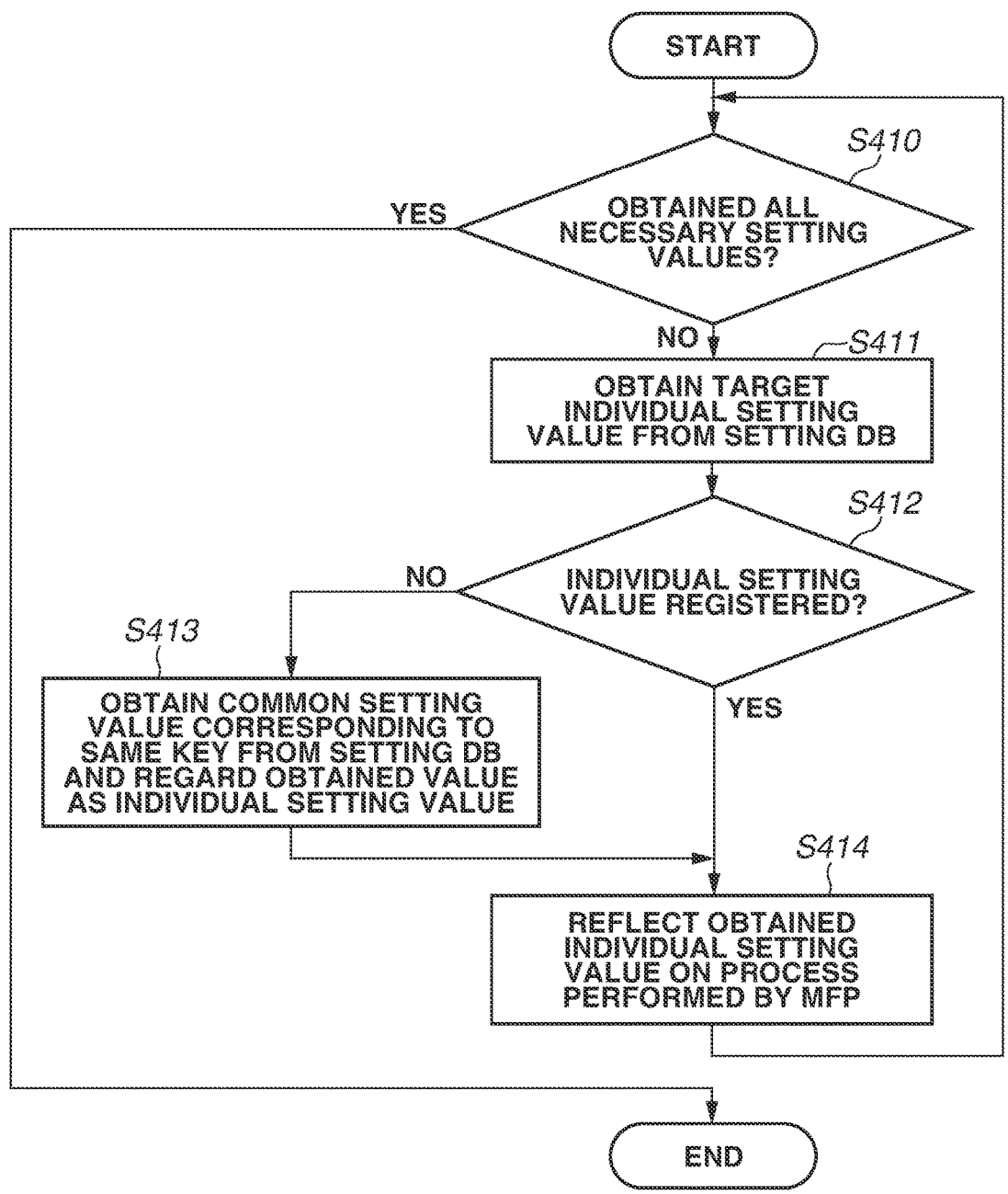

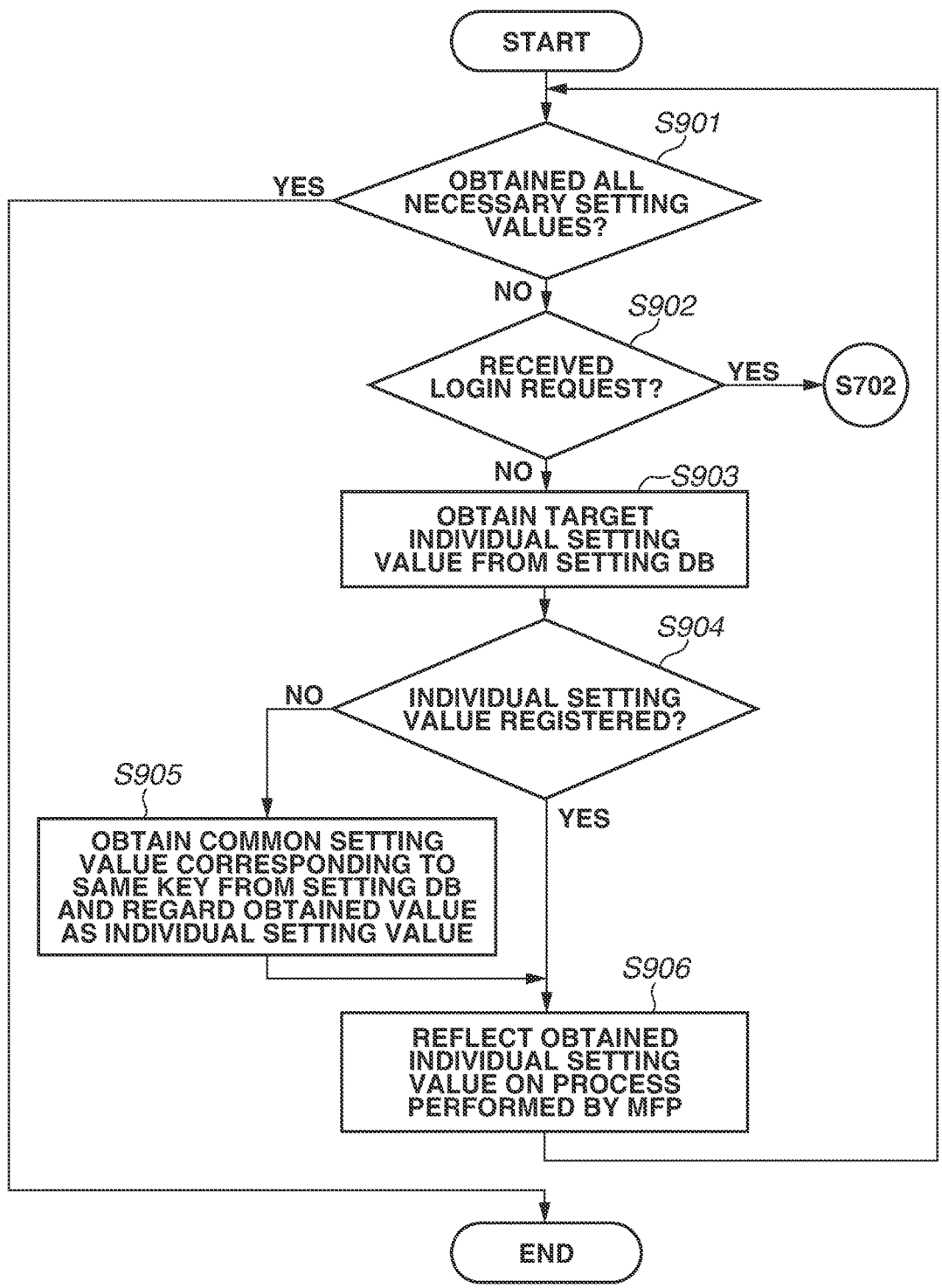

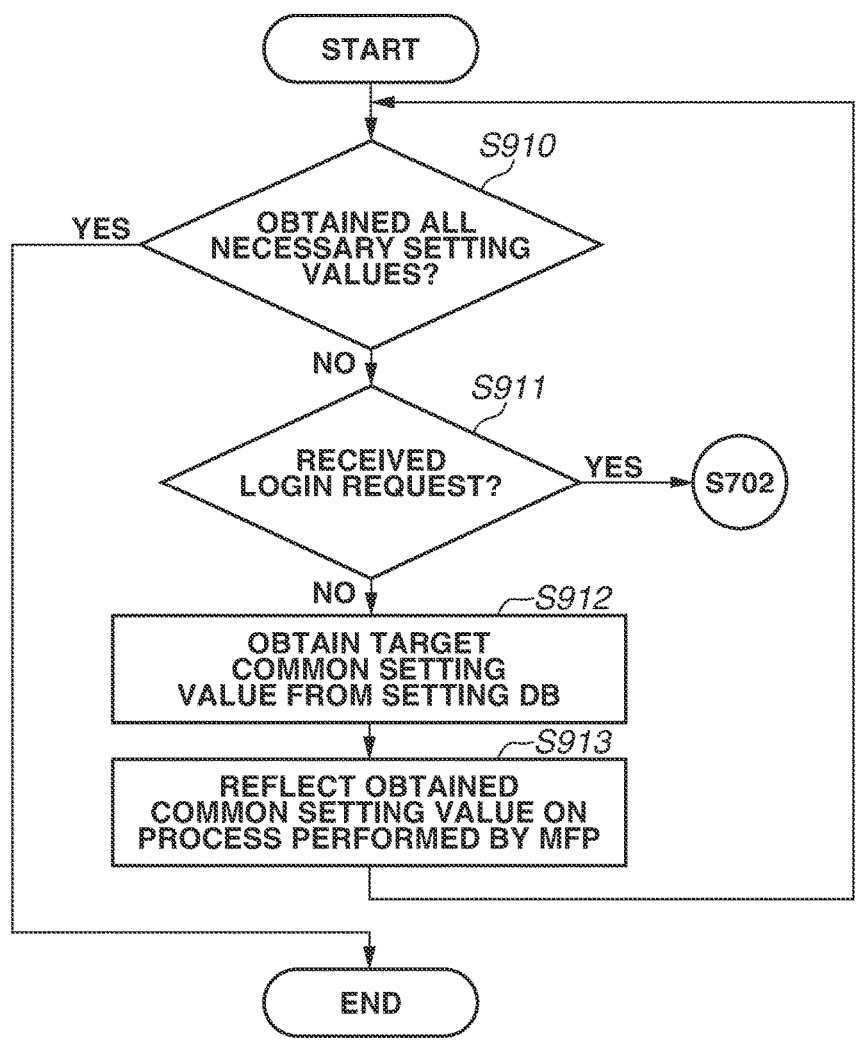

IMAGE FORMING APPARATUS, AND CONTROL METHOD OF IMAGE FORMING APPARATUS

CROSS-REFERENCE TO RELATED APPLICATIONS

This application is a Continuation, and claims the benefit, of U.S. patent application Ser. No. 14/747,105, presently pending and filed on Jun. 23, 2015, and claims the benefit of, and priority to, Japanese Patent Application No. 2014-129444, filed Jun. 24, 2014, which applications are hereby incorporated by reference herein in their entireties.

BACKGROUND

Field

Aspects of the present invention generally relate to an image forming apparatus having a function for customizing for each user, and a control method thereof.

Description of the Related Art

Recent image forming apparatuses include various functions, and operation contents performed by users have also become more complex.

In general, an image forming apparatus is often shared by some users. There is thus an auto clear function for automatically clearing, if a user has changed setting values of the image forming apparatus, the changed setting values after a predetermined time. A subsequent user is then prevented from using the image forming apparatus without noticing that the setting values have been changed. In such a use case, it is necessary for a user to select a desired setting screen from an initial menu of the image forming apparatus each time the user uses the image forming apparatus and change the setting values. As a result, even if setting values of setting information regularly used by each user are fixed, it is necessary for each user to set the same setting values every time, and thus it becomes burdensome.

For example, it is assumed that a setting value of display language information is set to Japanese in an image forming apparatus. A user who desires to use the image forming apparatus with the display language set to English is required to perform the following operation. The user changes the setting value of display language information from Japanese to English, uses the desired function, and then changes the setting value of display language information from English to Japanese.

To address the above-described situation, there is an image forming apparatus which includes a customize function to be used by a user to set individual setting values. The initial values and behavior of the image forming apparatus can thus be changed according to the individual setting values, and use of the functions can be limited to an individual user who registers a shortcut function.

However, it is desirable that setting values of setting information for an individual user are automatically set to setting information of the image forming apparatus, for further improving user-friendliness. However, if the setting values of individual user are left to be set, it may not be useful for a different user when the different user uses the image forming apparatus. It is thus desirable that the setting information of the image forming apparatus is automatically changed to common setting values when a user ends using the image forming apparatus.

Japanese Patent Application Laid-Open No. 2006-26972 discusses a technique for associating language identification information indicating a type of language with personal authentication data, and switching a language to be used on an operation screen or printing of a report to a language indicated by the associated language identification information. According to the above-described technique, when execution of a job has been completed, a non-operating state has continued for a predetermined time, or a job input operation has been completed after the language has been switched, the language used on the operation screen is switched back to the previous language.

The image forming apparatus on which the setting value of display language information can be set for each user performs an authentication process (i.e., a login process) for identifying a user when the user uses the image forming apparatus. The image forming apparatus performs a process for switching the setting value of display language information to a setting value of setting information for the user, at the time of login. Then, when the user ends using the image forming apparatus, the user logs out (hereinafter, the process for changing from the logged-in state to a not logged-in state will be referred to as a logout process). The image forming apparatus switches the setting value of display language information to a setting value of common display language information, at the time of logout.

Further, the image forming apparatus is capable of employing integrated circuit (IC) card authentication or biometrics authentication as an authentication process for identifying a user. A user brings an IC card close to a receiving unit of the image forming apparatus, or a part of the body relating to the biometrics authentication close to an identification unit of the image forming apparatus, and can thus log into the image forming apparatus.

According to the above-described configuration, a user can interrupt another user by the IC card authentication or the biometrics authentication and log into the image forming apparatus without using operation keys while another user is using the image forming apparatus.

In such a case, the logout process of a previous user is performed as the authentication process, and the login process of an interrupting user is then performed. As a result, the image forming apparatus switches the display language to a common display language when the previous user logs out and further switches the display language to a display language of login user when the interrupting user logs in. An unnecessarily switching process is thus involved, and a login operation becomes delayed.

For example, when a user A is logged in the image forming apparatus using French as the display language, a user B whose setting value of display language is English may log in. The image forming apparatus once switches the display language to the common display language (e.g., Japanese) when performing the logout process and then switches the display language to English when the user B logs in.

Further, there is an image forming apparatus capable of switching setting values of setting information other than the display language. With such an image forming apparatus, setting values of all types of setting information are switched to setting values of common setting information when a user logs out. As a result, excessive processing is involved and the login operation becomes delayed.

SUMMARY

Aspects of the present invention are generally directed to promptly performing a login process of a new user.

According to an aspect of the present invention, an image forming apparatus includes a first setting unit configured to set, in a case where a login request is received and authentication of a user is successful, a setting value of individual setting information for the user to setting information of the image forming apparatus based on individual setting information associated with user identification information for identifying the user, and a second setting unit configured to set, in a case where a logout request is received, a setting value of common setting information to the setting information of the image forming apparatus based on common setting information, wherein the second setting unit omits, in a case where a login request of a new user is received while the user is logged in, a process for setting the setting value of the common setting information to the setting information of the image forming apparatus based on the common setting information, and the first setting unit sets a setting value of individual setting information for the new user to the setting information of the image forming apparatus based on individual setting information associated with user identification information for identifying the new user.

Further features of the present disclosure will become apparent from the following description of exemplary embodiments with reference to the attached drawings.

BRIEF DESCRIPTION OF THE DRAWINGS

FIG. 2 is a diagram illustrating an example of a software configuration of the MFP.

FIG. 6 is a diagram illustrating an example of screen transition.

FIG. 7B is a flowchart illustrating logout processing in detail.

FIG. 8 is a flowchart illustrating information processing performed by a setting value storage control unit in detail.

FIGS. 9A and 9B are flowcharts each illustrating the information processing performed by the setting value storage control unit in detail.

DESCRIPTION OF THE EMBODIMENTS

Exemplary embodiments will be described below with reference to the drawings.

Figure 1:
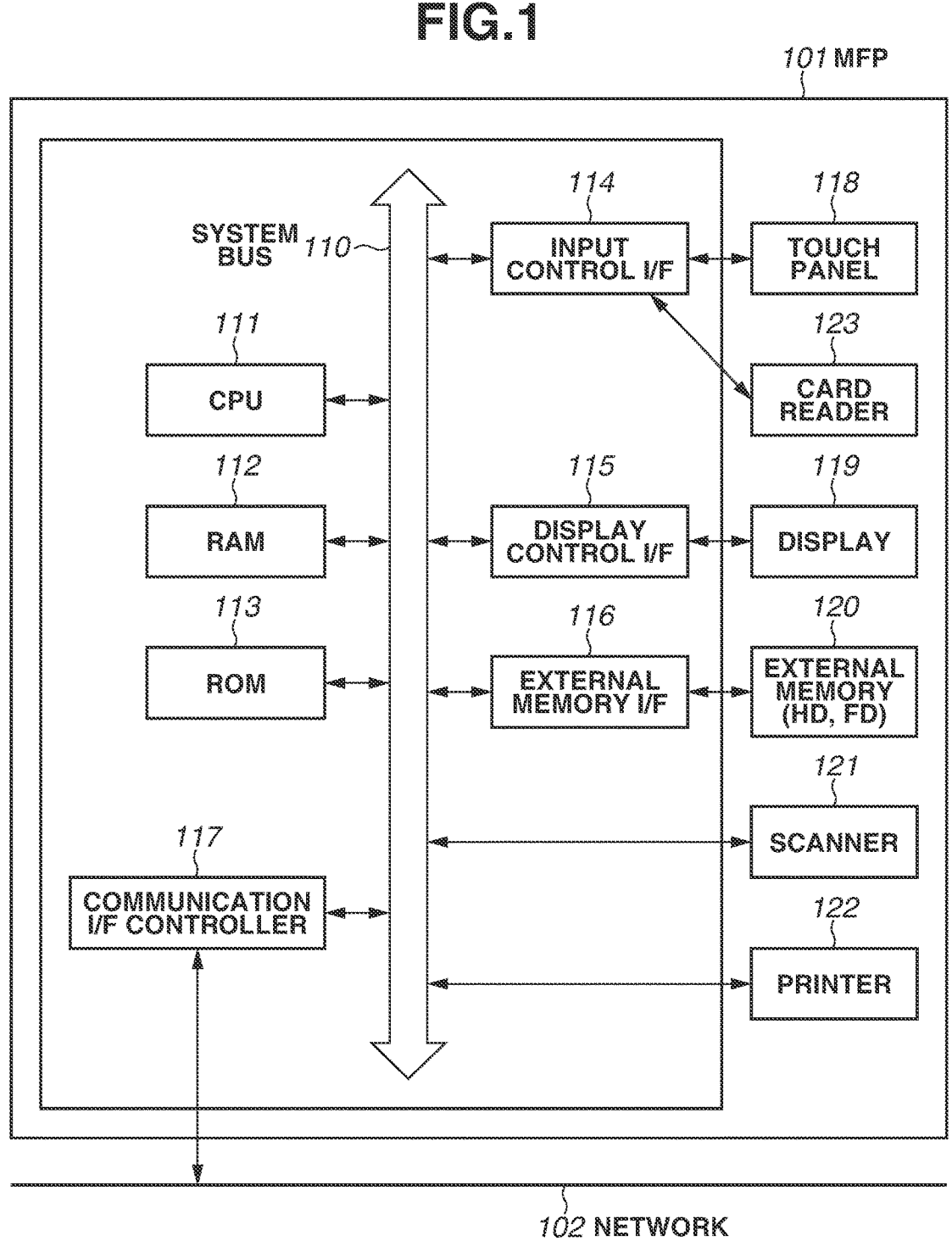
FIG. 1 is a diagram illustrating an example of a hardware configuration of a multifunction peripheral (MFP).

FIG. 1 is a diagram illustrating an example of a hardware configuration of a multifunction peripheral (MFP) 101. FIG. 1 illustrates an example for describing the present exemplary embodiment, and the MFP 101 may include other elements or may have a configuration having a similar effect as the present exemplary embodiment.

A central processing unit (CPU) 111, a random access memory (RAM) 112, a read-only memory (ROM) 113, an input control interface (I/F) 114, a display control I/F 115, an external memory I/F 116, and a communication I/F controller 117 are connected to a system bus 110. Further, a scanner 121 and a printer 122 are connected to the system bus 110. The units connected to the system bus 110 are capable of exchanging data between each other via the system bus 110.

The CPU 111 controls each device, and calculates and processes data.

The RAM 112 is a volatile memory used as a main memory and a temporarily storage area of, for example, a work area, of the CPU 111.

The ROM 113 is a non-volatile memory which stores image data, other data, and various programs for operations of the CPU 111, respectively in predetermined areas.

For example, the CPU 111 controls each unit of the MFP 101 according to the program stored in the ROM 113, using the RAM 112 as the work memory. The programs for the CPU 111 to operate are not limited to being stored in the ROM 113 and may also be stored in an external memory 120. The CPU 111 executes processes based on the programs so that the configuration of software of the MFP 101 and the processes of the flowcharts described below are realized.

The input control I/F 114 receives a user operation, generates a control signal according to the operation, and supplies the control signal to the CPU 111. For example, the input control I/F 114 is connected to a character information input device, such as a keyboard, and a pointing device, such as a mouse or a touch panel 118, as input devices for receiving the user operation. The touch panel 118 is, for example, an input device which is configured to output coordinate information according to a position touched on an input unit formed in a planar state. Further, the input control I/F 114 is connected to a card reader 123, which is a device for reading the IC card.

The CPU 111 controls each unit of the MFP 101 according to the program based on the control signal generated and supplied by the input control I/F 114 in response to the user operation performed on the input device. As a result, the CPU 111 is capable of causing the MFP 101 to execute processes according to the user operation. The display control I/F 115 outputs a display signal for causing a display 119 to display an image. For example, the CPU 111 supplies a display control signal generated according to the program to the display control I/F 115. The display control I/F 115 then generates the display signal based on the supplied display control signal and outputs the display signal to the display 119. More specifically, the display control I/F 115 causes the display 119 to display a graphical user interface (GUI) screen configuring a GUI, based on the display control signal generated by the CPU 111.

The touch panel 118 may be integrally-configured with the display 119. For example, the touch panel 118 is formed in such a manner that light transmittance thereof does not block displaying of the display 119 and attached to an upper layer of a display surface of the display 119. Input coordinates of the touch panel 118 are then associated with display coordinates of the display 119. The GUI which allows the user to feel as if directly operating on the screen displayed on the display 119 can thus be configured.

The external memory 120, such as a hard disk drive (HDD), a flash memory, or a memory card, is attachable to the external memory I/F 116. The external memory I/F 116 reads and writes data from and to the external memory 120 attached to the MFP 101, based on control of the CPU 111. The CPU 111 may also use the external memory 120 in place of the ROM 113 depending on the configuration.

The communication I/F controller 117 communicates with a local area network (LAN), the Internet, and wired and wireless network based on control of the CPU 111. Various devices, such as a personal computer (PC), another MFP, a printer, and a server, are connected to a network 102 so as to be capable of communicating with the MFP 101.

The scanner 121 reads a document and generates image data based on control of the CPU 111. For example, the CPU 111 causes the scanner 121 to perform scanning according to a user instruction input via the input control I/F 114. The scanner 121 reads a document placed on a document positioning plate or an auto document feeder (ADF), converts an image of the read document to digital data, and generates image data. The scanner 121 stores the generated image data in the external memory 120 via the external memory I/F 116.

The printer 122 prints, based on control of the CPU 111, the image data stored in the external memory 120. For example, the CPU 111 causes the printer 122 to print according to the user instruction input via the input control I/F 114 or a command input from the external device via the communication I/F controller 117. The printer 122 then reads the image data from the external memory 120, converts the read image data to a printable data format, and prints on a paper document.

The software configuration of the MFP 101 will be described below with reference to FIG. 2. FIG. 2 is a diagram illustrating an example for describing the present exemplary embodiment, and the MFP 101 may include other elements or may have a configuration having a similar effect as the present exemplary embodiment. The programs corresponding to each of the control units illustrated in FIG. 2 are stored in the ROM 113, developed in the RAM 112 as necessary at activation or use of the function, and executed by the CPU 111. As a result, each of the control units illustrated in FIG. 2 is realized.

The MFP 101 includes a display operation control unit 201, an authentication control unit 202, a setting value storage control unit 203, and a user mode control unit 204.

Further, the MFP 101 includes one or more functions. A control unit is provided for each of the functions, and a copy control unit 210, a transmission control unit 211, and a custom menu control unit 212 are illustrated in FIG. 2, as examples thereof. There are control units other than the control units illustrated in FIG. 2 for each of other functions related to the process by the MFP 101. Examples of the other functions include a secure print function, a help function, a facsimile function, and the like. The secure print function is for retaining a print job input from a driver in the MFP 101 and only allowing an authenticated user or a user knowing a password associated with the print job to print. The box function is for storing image data in the MFP 101. The help function is for displaying a help screen. The facsimile function is for receiving a facsimile document from a public communication network.

The display operation control unit 201 controls the input control I/F 114 and the display control I/F 115. For example, the display operation control unit 201 performs displaying on the display 119 via the display control I/F 115 based on an instruction from other control units. Further, the display operation control unit 201 obtains information input by the user on the touch panel 118 via the input control I/F 114.

The authentication control unit 202 performs an authentication process (hereinafter referred to as a login process) for identifying the user and determines whether an operator of the MFP 101 is a valid user of the MFP 101. Further, the authentication control unit 202 controls a database (hereinafter referred to as a user information DB 320) storing the user information in the external memory 120.

An example of the login process will be described below with reference to FIGS. 3A, 3B, and 4.

Figure 3A:
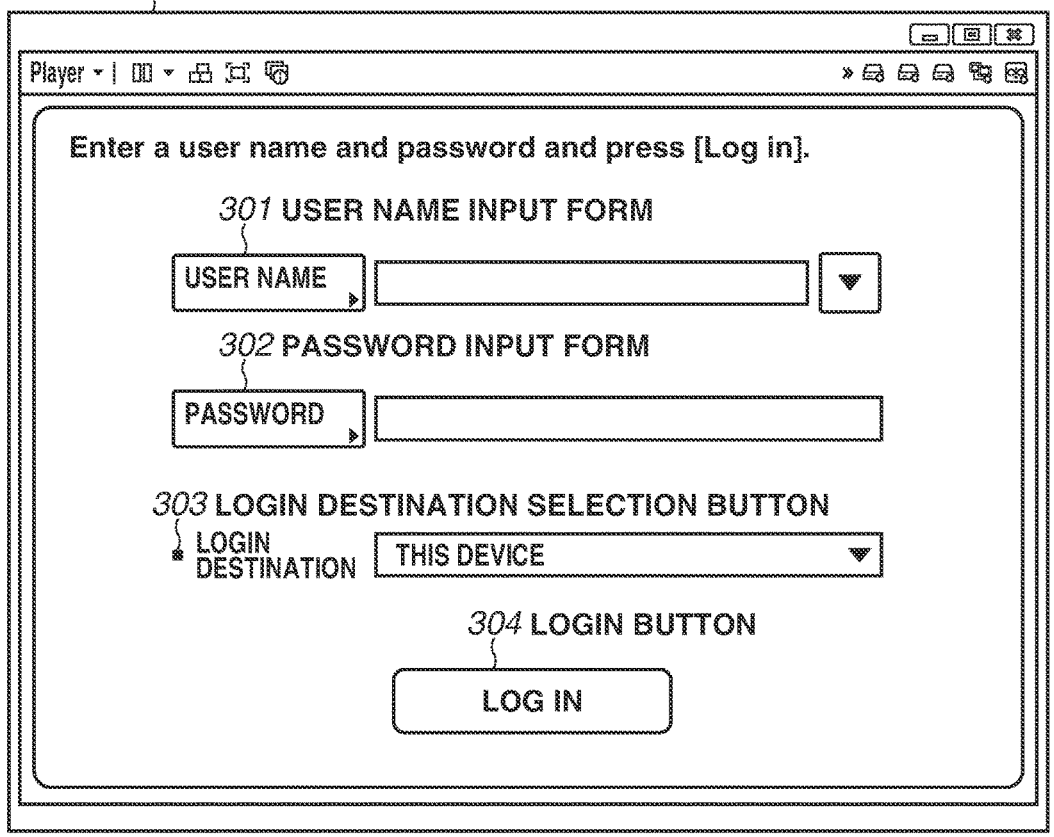
FIGS. 3A and 3B are diagrams each illustrating an example of a screen.

FIG. 3A is a diagram illustrating an example of an input screen of a login screen 300. Referring to FIG. 3A, the login screen 300 includes a user name input form 301, a password input form 302, a login destination selection button 303, and a login button 304. FIG. 3B is a diagram illustrating an example of a screen 310 for login.

Figure 3B:
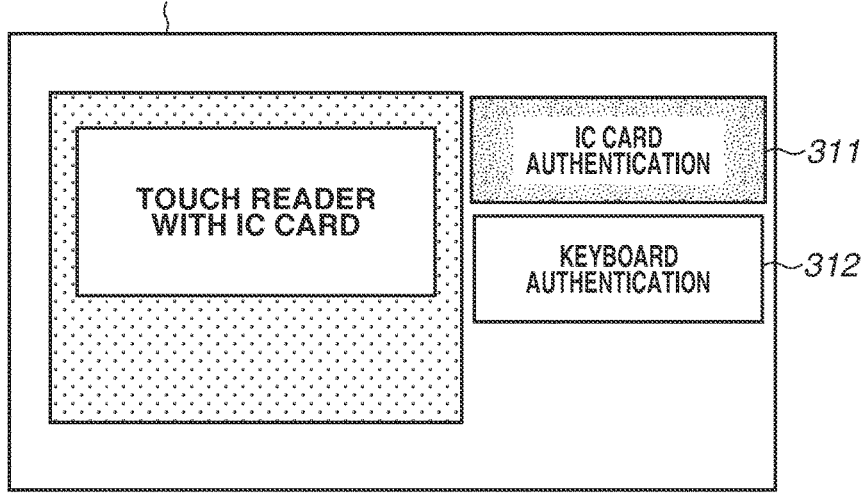

Referring to FIG. 3B, the user can select between IC card authentication 311 and keyboard authentication 312. The example of FIG. 3B illustrates that the user has selected the IC card authentication. The screen 310 for login displays a message prompting the user to log in using the IC card. The user uses, for example, the card reader 123 to allow the MFP 101 to read the IC card and thus logs in. On the other hand, when the user selects the keyboard authentication 312, the MFP 101 switches the screen displayed on the touch panel 118 from the screen 310 for login illustrated in FIG. 3B to the login screen 300 illustrated in FIG. 3A. In FIG. 3A, selection keys for selecting the IC card authentication 311 and the keyboard authentication 312 are not illustrated. However, the MFP 101 may display the selection keys in the login screen 300 illustrated in FIG. 3A.

Figure 4:
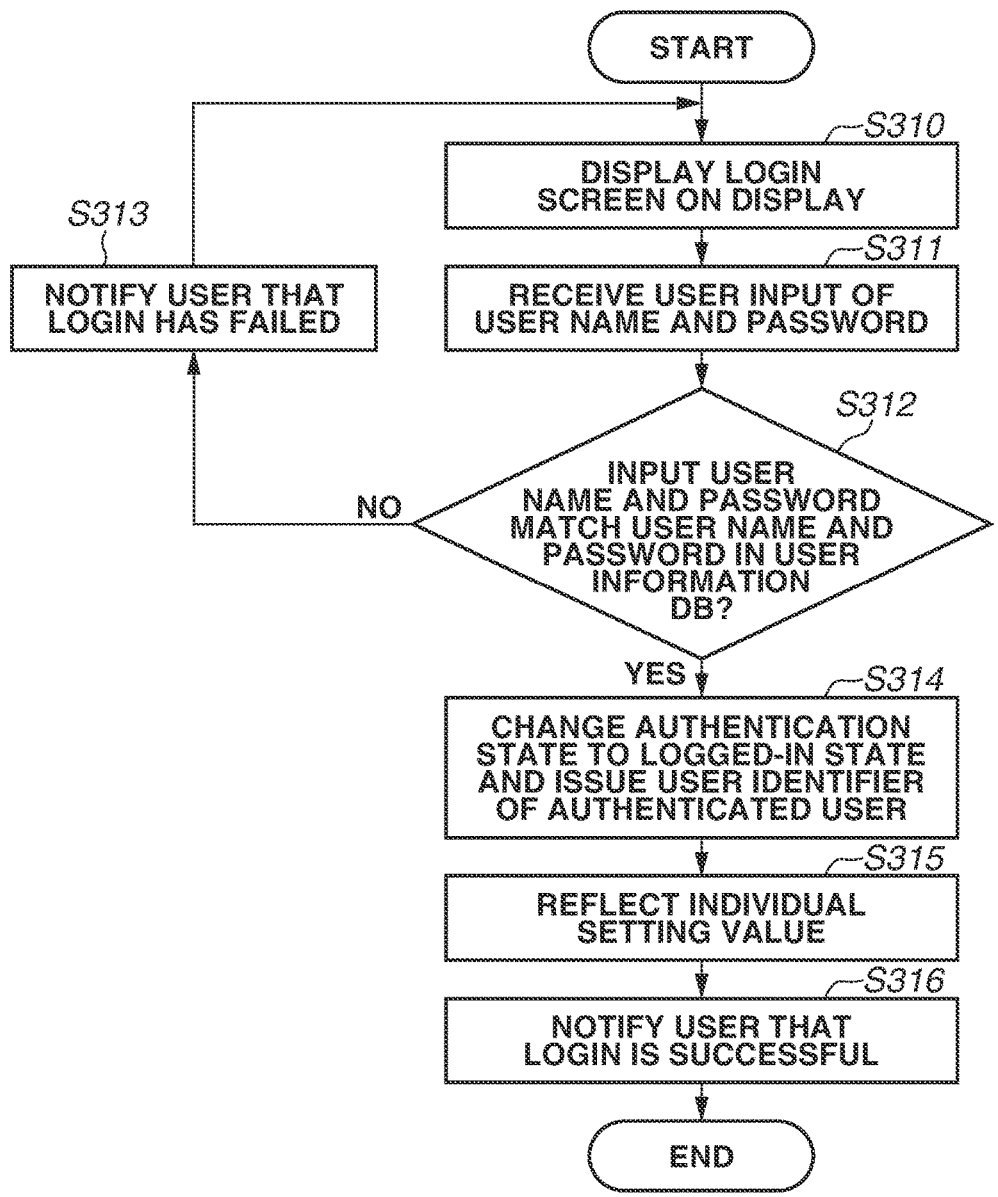
FIG. 4 is a flowchart illustrating an example of information processing performed by an authentication control unit.

FIG. 4 is a flowchart illustrating an example of information processing performed by the authentication control unit 202 when the user has instructed the MFP 101 to perform the login process. As described above, the process performed by the authentication control unit 202 is realized by the CPU 111 executing the program stored in the ROM 113. The authentication control unit 202 issues a request for executing the following process to each of the control units.

In step S310, the display operation control unit 201 displays the login screen 300 on the display 119. In step S311, upon the user performing an input operation on the touch panel 118, the display operation control unit 201 receives the user name from the user name input form 301 and the password from the password input form 302, via the display control I/F 115. In step S312, the authentication control unit 202 receives the user name and the password input in step S311 from the display operation control unit 201 and determines whether the received user name and password match the user name and the password in the user information DB 320. In a case where the user name and the password do not match (NO in step S312), the authentication control unit 202 determines that the login has failed, and the process proceeds to step S313. In step S313, the authentication control unit 202 notifies the user via the display operation control unit 201 that the login has failed, and the process returns to step S310, so that the MFP 101 returns to a login reception state. On the other hand, in a case where the user name and the password match (YES in step S312), the authentication control unit 202 determines that the authentication is successful, and the process proceeds to step S314. In step S314, the authentication control unit 202 changes the authentication state from a not logged-in state to a logged-in state and issues a user identifier 321. In step S315, the authentication control unit 202 performs a process for reflecting individual setting values via the setting value storage control unit 203. The process performed in step S315 will be described in detail below with reference to FIG. 8. In step S316, the authentication control unit 202 notifies the user via the display operation control unit 201 that the login is successful. The process illustrated in FIG. 4 thus ends.

The authentication method is not limited to the above. Alternatively, other authentication methods, for example, a method using a noncontact type IC card, may be employed. Further, it is not necessary for the user information DB 320 to be included in the MFP 101, and the authentication may be performed using an external authentication server, such as an Active Directory (AD) and the like. In such a case, the authentication control unit 202 requests the external authentication server via the communication I/F controller 117 to perform the authentication and matching. Furthermore, the MFP 101 may be configured to be capable of switching use between the user information DB 320 therein and the external authentication server. In such a configuration, the user selects on a screen, such as the screen illustrated in FIG. 3A, the authentication server to perform the authentication by pressing the login destination selection button 303.

Moreover, the authentication control unit 202 provides functions for registering and deleting a user and updating user information. Further, the authentication control unit 202 provides a group function. The group is a collection of a plurality of users, and the authentication control unit 202 is capable of registering a plurality of groups. The user may belong to none or any number of groups. The authentication control unit 202 provides functions for registering and deleting a group, updating group information, and allowing a user to join or withdraw from a group.

Furthermore, the authentication control unit 202 stores the user identifier 321 and an identifier for uniquely identifying a group (hereinafter referred to as a group identifier 322) in the user information DB 320.

The authentication control unit 202 stores information indicating which user belongs to which group in the user information DB 320.

The setting value storage control unit 203 will be described below. The setting value storage control unit 203 is the control unit for storing common setting information, individual setting information, and group setting information. The common setting information is setting information to which all users refer. The individual setting information is the setting information to which a corresponding user can only refer. The group setting information is the setting information to which users belonging to a corresponding group can only refer. The setting information includes a pair of one or more setting items and setting values set to the setting items.

Figure 5:
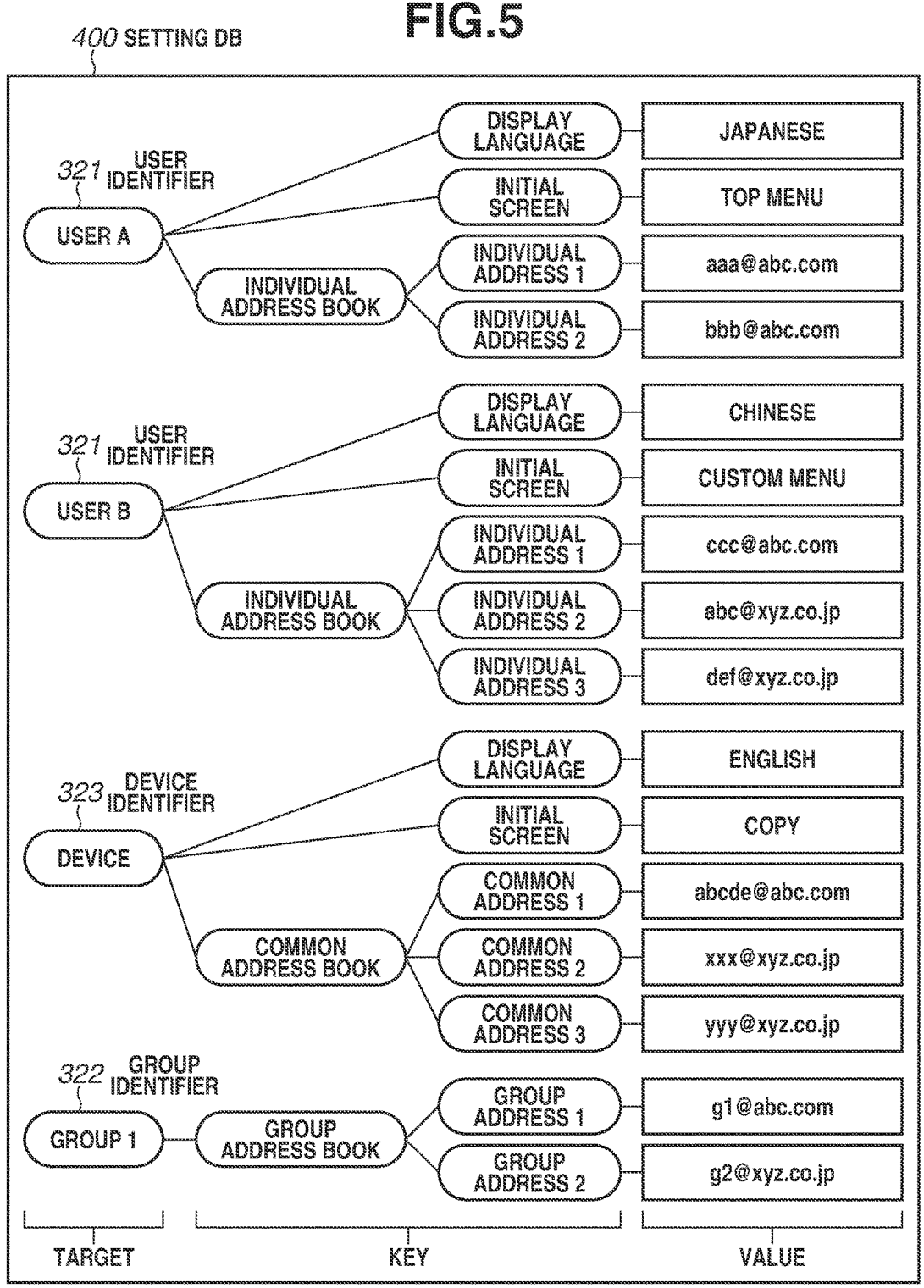
FIG. 5 is a diagram illustrating an example of a setting database (DB).

The setting value storage control unit 203 stores each of the setting values in a setting DB 400 in the external memory 120. FIG. 5 is a diagram illustrating an example of the setting DB 400. The setting DB 400 stores pairs of a key for identifying a setting value and the setting value, as the setting information. The setting DB 400 is expressed in a layered structure. A first layer includes target information. The target includes information for identifying whether the information is the common setting information, the individual setting information, or the group setting information. In the case of the individual setting information, the target includes the user identifier 321 for identifying the user. In the case of the group setting information, the target includes the group identifier 322 for identifying the group. In the setting DB 400 illustrated in FIG. 5, a device identifier 323 is indicated as "device", the user identifier 321 as "user name", and the group identifier 322 as "group name", for ease of description. A corresponding value is determined by a combination of the target and the key. As illustrated in FIG. 5, the individual setting information is set associated with the user identifier in the setting DB 400. The user identifier is an example of the user identification information.

In the example illustrated in FIG. 5, a setting value corresponding to a key "display language" for a target "user A" is "Japanese". A setting value corresponding to the key "display language" for a target "user B" is "Chinese". In another example, a setting value corresponding to a key "individual address book-individual address 1" for the target "user B" is "ccc@abc.com". The individual setting information is stored for the number of users. In contrast, the device setting information (i.e., the common setting information) is the only setting information in the MFP 101. In the case of the example illustrated in FIG. 5, a setting value corresponding to a key "device-display language" is "English". A setting value corresponding to a key "group address book-group address 1" for a target "group 1" is "gl@abc.com". For example, it is assumed that the user A and the user B belong to the group 1. The user A and the user B can thus refer to the group address book of the group 1. However, a user C not belonging to the group 1 cannot refer to the group address book of the group 1.

Among the setting information in the setting DB 400, there are the individual setting information and the common setting information which share the same key and which do not share the same key. In a case where the individual setting information and the common setting information share the same key, the common setting value is treated as an initial setting value when the individual setting value is not registered. In the example illustrated in FIG. 5, an individual setting for the user C is not registered. In such a case, "English" which is the common setting value is applied to the display language information for the user C.

Further, in a case where the individual setting information and the common setting information do not share the same key, the individual setting information is treated as not registered or that the number of registrations thereof is 0. For example, a key "individual address book" exists for only the setting information in which the target is "individual" (the address book will be described below). In contrast, a key "common address book" exists for only the setting information in which the target is "device". In the example illustrated in FIG. 5, there are no individual address books for the user C. Since the common setting information exists, the user C can refer to "common address 1", "common address 2", and "common address 3" in the common address book.

The setting value storage control unit 203 reads the individual setting values in the setting DB 400 at a time of login and reflects the read setting values on respective setting information of the MFP 101. The user can thus use the MFP 101 customized according to the setting values of the individual setting information registered thereby. Further, the setting value storage control unit 203 reads the common setting values in the setting DB 400 at a time of logout and reflects the read common setting values on respective setting information of the MFP 101. As a result, functions which can be used in the not logged-in state can be used according to the common setting values. As illustrated in FIG. 5, the setting information includes the display language information, the initial screen information, and the address book information.

The display language information will be described below with reference to FIG. 6 as an example of individual setting information which can be customized. FIG. 6 is a diagram illustrating a state in which the user A logs in and the screen changes from the login screen 300 to a top menu screen 410. It is assumed that the setting value of display language information in the common setting information is "English" and the setting value of display language information for the user A is "Japanese". Since the common setting values are valid in the login screen 300 where the authentication state is in the not logged-in state, the screen is displayed in "English" as the display language, as in the screen illustrated on the left side of FIG. 6. When the user A then logs in and the authentication is successful, the setting value of display language information for the user A is reflected in step S315 of the flowchart illustrated in FIG. 4. The screen in the logged-in state is thus displayed in "Japanese" as the display language, as in the screen illustrated on the right side of FIG. 6. Further, when the user A logs outs, the setting value of common display language information is reflected, so that the login screen 300 is displayed in "English" as the display language.

Figure 7A:
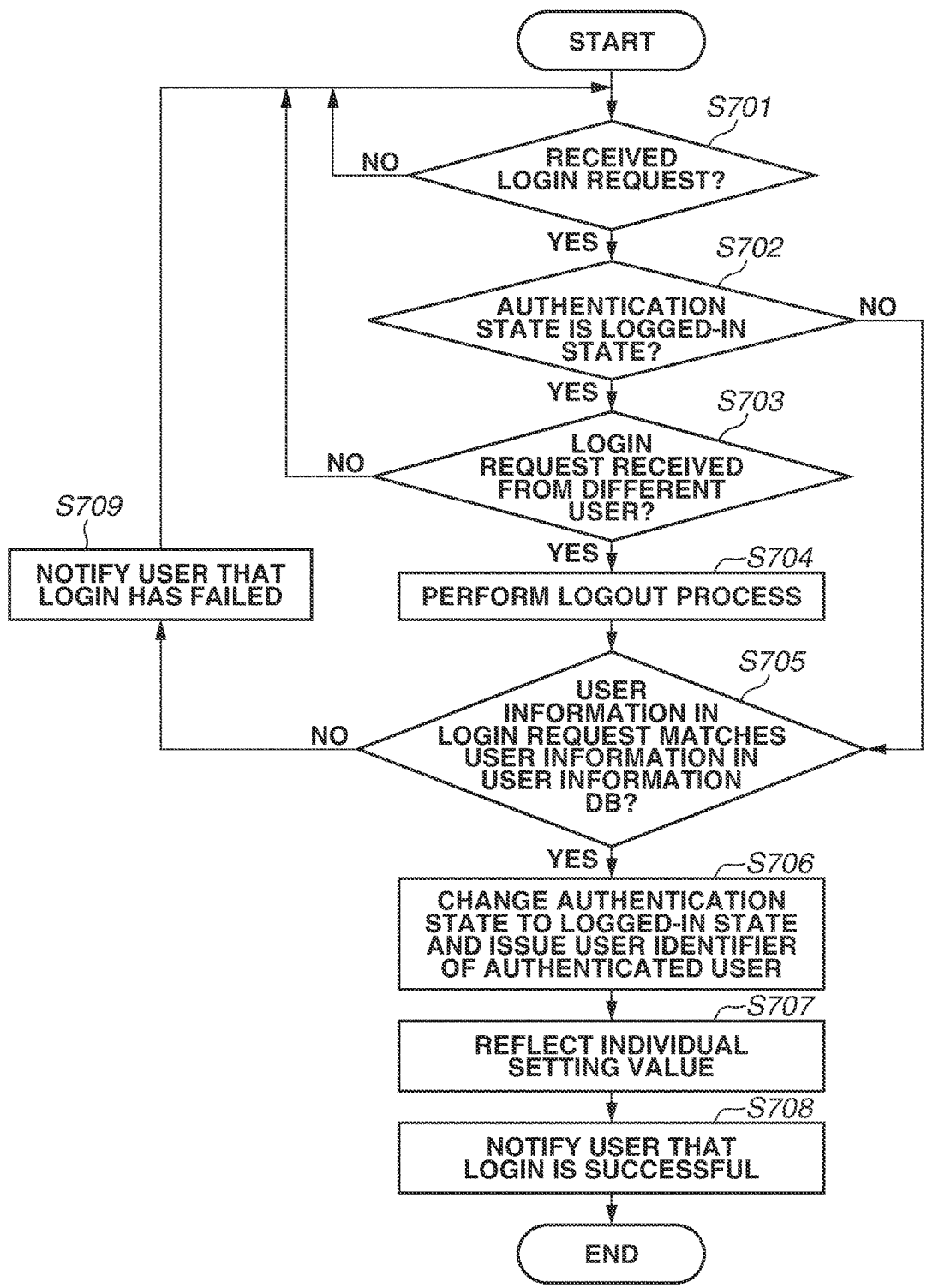
FIG. 7A is a flowchart illustrating an example of the image processing performed by the authentication control unit.

FIG. 7A is a flowchart illustrating an example of information processing performed by the authentication control unit 202, when the user has instructed interrupt login. As described above, the process performed by the authentication control unit 202 is realized by the CPU 111 executing the program stored in the ROM 113. The authentication control unit 202 issues a request for executing the following process to each of the control units.

In step S701, the authentication control unit 202 determines whether the login request has been received from the display operation control unit 201. In a case where the authentication control unit 202 determines that the request has been received (YES in step S701), the process proceeds to step S702.

In step S702, the authentication control unit 202 determines whether the authentication state is in the logged-in state. In a case where the authentication control unit 202 determines that the authentication state is in the logged-in state (YES in step S702), the process proceeds to step S703. In a case where the authentication control unit 202 determines that the authentication state is not in the logged-in state (NO in step S702), the process proceeds to step S705.

In step S703, the authentication control unit 202 determines whether the login request received in step S701 is a login request from a user (i.e., a new user) different from the logged-in user. In a case where the authentication control unit 202 determines that the login request is from a different user (YES in step S703), the process proceeds to step S704.

In step S704, the authentication control unit 202 executes the logout process of the previous user. The logout process will be described in detail below with reference to FIG. 7B.

In step S705, the authentication control unit 202 determines whether user information in the login request matches the user information in the user information DB 320.

In a case where the user information in the login request does not match (NO in step S705), the process proceeds to step S709. In step S709, the authentication control unit 202 determines that the login has failed and notifies the user that the login has failed. On the other hand, in a case where the user information in the login request matches (YES in step S705), the process proceeds to step S706.

In step S706, the authentication control unit 202 determines that the authentication is successful. The authentication control unit 202 then changes the authentication state from the not logged-in state to the logged-in state and issues the user identifier 321.

In step S707, the authentication control unit 202 performs via the setting value storage control unit 203 the process for reflecting the individual setting values described in detail below with reference to FIG. 8. In step S708, the authentication control unit 202 notifies the user via the display operation control unit 201 that the login is successful, and the login process illustrated in FIG. 7A ends.

FIG. 7B is a flowchart illustrating in detail the logout process performed in step S704 of the flowchart illustrated in FIG. 7A. The process of changing a logged-in state to the not logged-in state is referred to as logout.

In step S721, the authentication control unit 202 changes the authentication state from the logged-in state to the not logged-in state.

In step S722, the authentication control unit 202 releases the user identifier obtained at the time of login.

In step S723, the authentication control unit 202 determines whether the login request has been received from the display operation control unit 201. In a case where the authentication control unit 202 determines that the login request has been received (YES in step S723), the logout process ends.

If the authentication control unit 202 determines that the login request has not been received (NO in step S723), the process proceeds to step S724. This process corresponds to a case where the user has issued a logout request from the touch panel 118.

In step S724, the setting value storage control unit 203 refers to a list of the keys in the setting information and determines whether all of the setting values of the common setting information (i.e., the common setting values) have been obtained. In a case where not all of the common setting values have been obtained (NO in step S724), the process proceeds to step S725. In a case where all of the common setting values have been obtained (YES in step S724), the process proceeds to step S727.

In step S725, the setting value storage control unit 203 obtains the common setting values from the setting DB 400.

In step S726, the setting value storage control unit 203 transmits the obtained common setting values to respective control units and issues a request for changing the processes to each control unit. The process then returns to step S724, and the setting value storage control unit 203 determines whether all of the setting values with respect to the keys included in the list have been processed. In a case where all of the setting values have been processed (YES in step S724), the process proceeds to step S727.

In step S727, the authentication control unit 202 notifies the user via the display operation control unit 201 that the logout is successful. The logout process thus ends.

By performing the process of the above-described flowchart, in a case where the new user logs in while the previous user is logged in, the processes performed in step S724 to step S727 are omitted. As a result, the unnecessary process of reflecting the common setting values is not performed.

FIG. 8 is a flowchart illustrating in detail the information processing performed by the setting value storage control unit 203 for controlling reflecting of the individual setting values in step S315 of the flowchart illustrated in FIG. 4 and step S707 of the flowchart illustrated in FIG. 7A. As described above, the process performed by the setting value storage control unit 203 is realized by the CPU 111 executing the program stored in the ROM 113. The setting value storage control unit 203 issues a request for executing the following process to each of the control units.

In step S410, the setting value storage control unit 203 refers to the list of the keys in the setting information indicating the setting values required to be reflected at the time of login. The setting value storage control unit 203 then determines whether all of the setting values with respect to the keys included in the list have been obtained. The list is stored in, for example, the setting DB 400. In a case where not all of the individual setting values have been obtained (NO in step S410), the process proceeds to step S411. In step S411, the setting value storage control unit 203 receives the user identifier 321 issued in step S314 of the flowchart illustrated in FIG. 4 from the authentication control unit 202 and obtains the individual setting values of corresponding user from the setting DB 400. In step S412, the setting value storage control unit 203 determines whether the individual setting values are registered. In a case where the setting value storage control unit 203 determines that the individual setting values are not registered (NO in step S412), the process proceeds to step S413. In a case where the setting value storage control unit 203 determines that the individual setting values are registered (YES in step S412), the process proceeds to step S414. In step S413, the setting value storage control unit 203 obtains the common setting values corresponding to the same key and treats the obtained common setting values as the individual setting values. In step S414, the setting value storage control unit 203 transmits the obtained individual setting values to respective control units and issues the request to change the processes to each of the control units. The process then returns to step S410, and the setting value storage control unit 203 determines whether all of the setting values with respect to the keys included in the list have been processed. In a case where all of the setting values have been processed (YES in step S410), the process of the flowchart illustrated in FIG. 8 ends.

In a case where a new login instruction is received during the processing of the setting values, the processing of the setting values can be cancelled and the login process of the user to be newly logged in may be performed. By performing such a method, unnecessary switching of the setting values can be omitted not only from the logout process performed while a user is logged in and also from the login process performed while the logout process is performed and the login process performed while another login process is performed. Referring to FIG. 9, the details will be described below.

FIG. 9A is a flowchart illustrating in detail the information processing performed by the setting value storage control unit 203 for controlling reflecting of the individual setting values in step S707 of the flowchart illustrated in FIG. 7A. More specifically, FIG. 9A is a flowchart illustrating an example of the information processing performed in a case where a login has occurred while the process for reflecting the setting values at the time of login is performed. As described above, the process performed by the setting value storage control unit 203 is realized by the CPU 111 executing the program stored in the ROM 113. The setting value storage control unit 203 issues a request for executing the following process to each of the control units.

In step S901, the setting value storage control unit 203 refers to the list of the keys in the setting information indicating the setting values required to be reflected at the time of login. The setting value storage control unit 203 then determines whether all of the setting values with respect to the keys included in the list have been obtained. For example, the list is stored in the setting DB 400. In a case where the setting value storage control unit 203 determines that not all of the individual setting values have been obtained (NO in step S901), the process proceeds to step S902. In a case where the setting value storage control unit 203 determines that all of the individual setting values have been obtained (YES in step S901), the process illustrated in FIG. 9A ends.

In step S902, the setting value storage control unit 203 determines whether a login request has been received from the display operation control unit 201. In a case where the setting value storage control unit 203 determines that the login request has been received (YES in step S902), the process proceeds to step S702 of the flowchart illustrated in FIG. 7A. In a case where the setting value storage control unit 203 determines that the request has not been received (NO in step S902), the process proceeds to step S903.

In step S903, the setting value storage control unit 203 receives the user identifier 321 issued in step S706 of the flowchart illustrated in FIG. 7A from the authentication control unit 202 and obtains the individual setting values of the corresponding user from the setting DB 400.

In step S904, the setting value storage control unit 203 determines whether the individual setting values are registered. In a case where the setting value storage control unit 203 determines that the individual setting values are not registered (NO in step S904), the process proceeds to step S905. In a case where the setting value storage control unit 203 determines that the individual setting values are registered (YES in step S904), the process proceeds to step S906.

In step S905, the setting value storage control unit 203 obtains the common setting values corresponding to the same key and treats the obtained common setting values as the individual setting values.

In step S906, the setting value storage control unit 203 transmits the obtained individual setting values to respective control units and issues the request to change the processes to each of the control units. The process then returns to step S901, and the setting value storage control unit 203 determines whether all of the setting values with respect to the keys included in the list have been processed. In a case where the setting value storage control unit 203 determines that all of the setting values have been processed (YES in step S901), the process of the flowchart illustrated in FIG. 9A ends.

FIG. 9B is a flowchart illustrating in detail the information processing performed by the setting value storage control unit 203 for controlling reflecting of the common setting values in step S724 to step S726 of the flowchart illustrated in FIG. 7B. More specifically, the FIG. 9B is a flowchart illustrating an example of the information processing performed in a case where a login has occurred while the process for reflecting the setting values at the time of logout is performed. The setting value storage control unit 203 issues a request to execute the following process to each of the control units.

In step S910, the setting value storage control unit 203 refers to the list of the keys in the setting information and determines whether all of the setting values have been obtained. In a case where the setting value storage control unit 203 determines that not all of the setting values have been obtained (NO in step S910), the process proceeds to step S911. In a case where the setting value storage control unit 203 determines that all of the setting values have been obtained (YES in step S910), the process illustrated in FIG. 9B ends.

In step S911, the authentication control unit 202 determines whether a login request has been received from the display operation control unit 201. In a case where the authentication control unit 202 determines that the login request has been received (YES in step S911), the process proceeds to step S702 of the flowchart illustrated in FIG. 7A. In a case where the authentication control unit 202 determines that the request has not been received (NO in step S911), the process proceeds to step S912.

In step S912, the setting value storage control unit 203 obtains the common setting values from the setting DB 400.

In step S913, the setting value storage control unit 203 transmits the obtained common setting values to respective control units and issues the request to change the processes to each of the control units.

The process then returns to step S910, and the setting value storage control unit 203 determines whether all of the setting values with respect to the keys included in the list have been processed. If all of the setting values have been processed (YES in step S910), the process of the flowchart illustrated in FIG. 9A ends.

The above-described exemplary embodiments may also be realized by providing a program to a system or an apparatus via a network or a storage medium and one or more processor in a computer of the system or the apparatus reading and executing the program. Further, the above-described exemplary embodiments may be realized by a circuit (such as an application specific IC (ASIC)) which realizes one or more functions.

According to the above-described exemplary embodiments, in a case where an image forming apparatus receives a new login request while a user is logged in, the image forming apparatus reflects individual setting values of a new user on setting values without reflecting common setting values when performing a logout process. As a result, a login process of the new user can be promptly performed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that these exemplary embodiment are not seen to be limiting. The scope of the following claims is to be accorded the broadest interpretation so as to encompass all such modifications and equivalent structures and functions.

What is claimed is:

1. An image processing apparatus comprising:
   one or more memories that store first language information associated with a first user and second language information associated with a second user;
   a display that displays an operation screen; and
   one or more processors that operate to:
   receive a login request from a user;
   cause the display to display a first operation screen using the first language information stored in association with the first user according to the login of the first user to the image processing apparatus;
   cause the first user to log out of the image processing apparatus according to receipt of a login request from the second user while the first user is logging in to the image processing apparatus; and
   cause the display to switch from the display of the first operation screen to a display of a second operation screen using the second language information stored in association with the second user according to the login of the second user to the image processing apparatus.

2. The image processing apparatus according to claim 1, wherein the one or more processors operate to:
   cause the first user to log out of the image processing apparatus according to receipt of a log out operation while the first user is logging in to the image processing apparatus.

3. The image processing apparatus according to claim 2, wherein the one or more memories store device language information; and
   wherein the one or more processors operate to:
   determine whether the log out by the first user has been caused by the receipt of the log out operation or the receipt of the login request from the second user, and
   cause the display to switch from the display of the first operation screen to a display of a third operation screen using the device language information based on a result of the determination.

4. The image processing apparatus according to claim 3, wherein the one or more processors operate to:
   cause the display to switch the display of the first operation screen to the display of the third operation screen in a case where the log out by the first user is determined to have been caused by the receipt of the log out operation, and
   prohibit the display from switching the display of the first operation screen to the display of the third operation screen in a case where the log out by the first user is determined to have been caused by the receipt of the login request from the second user.

5. The image processing apparatus according to claim 1, wherein the one or more processors operate to:
   according to receipt of a login request from the second user, determine whether the first user is logged in to the image processing apparatus or not; and
   in a case where it is determined that the first user is logged in to the image processing apparatus, cause the first user to log out of the image processing apparatus.

6. The image processing apparatus according to claim 1, wherein the one or more processors operate to:
   cause the display to display a login screen for accepting an input of login information from the user; and
   receive a login request from the user on a basis of operation by the user via the login screen.

7. The image processing apparatus according to claim 1, further comprising:
   a scanner configured to generate image data by reading an image on a document; and
   a printer configured to print an image on paper on a basis of the image data generated by the scanner.

8. The image processing apparatus according to claim 7, further comprising:
   an interface via which the image data generated by the scanner is transmitted outside of the image processing apparatus.

9. A method for controlling an image processing apparatus that stores first language information associated with a first user and second language information associated with a second user, the method comprising:
   receiving a login request from a user;

displaying a first operation screen using the first language information stored in association with the first user according to the login of the first user to the image processing apparatus;

causing the first user to log out of the image processing apparatus according to receipt of a login request from the second user while the first user is logging in to the image processing apparatus; and switching from the display of the first operation screen to a display of a second operation screen using the second language information stored in association with the second user according to the login of the second user to the image processing apparatus.

10. A non-transitory computer-readable storage medium storing at least one program for causing a computer to execute a method for controlling an image processing apparatus that stores first language information associated with a first user and second language information associated with a second user, the method comprising:

receiving a login request from a user;

displaying a first operation screen using the first language information stored in association with the first user according to the login of the first user to the image processing apparatus;

causing the first user to log out of the image processing apparatus according to receipt of a login request from the second user while the first user is logging in to the image processing apparatus; and switching from the display of the first operation screen to a display of a second operation screen using the second language information stored in association with the second user according to the login of the second user to the image processing apparatus.

11. An image processing apparatus comprising:

one or more memories that store first language information associated with a first user and second language information associated with a second user;

a display that displays an operation screen; and one or more processors that operate to:

receive an authentication request for login from the first user;

cause the display to display a first operation screen using the first language information stored in association with the first user according to the login of the first user to the image processing apparatus;

cause the first user to log out of the image processing apparatus according to receipt of an authentication request for login from the second user while the first user is logging in to the image processing apparatus; and cause the display to switch from the display of the first operation screen to a display of a second operation screen using the second language information stored in association with the second user according to the login of the second user to the image processing apparatus.

12. The image processing apparatus according to claim 11, wherein the one or more processors operate to:

cause the first user to log out of the image processing apparatus according to receipt of a log out operation while the first user is logging in to the image processing apparatus.

13. The image processing apparatus according to claim 12, wherein the one or more memories store device language information; and wherein the one or more processors operate to:

determine whether the log out by the first user has been caused by the receipt of the log out operation or the receipt of the authentication request from the second user, and cause the display to switch from the display of the first operation screen to a display of a third operation screen using the device language information based on a result of the determination.

14. The image processing apparatus according to claim 13, wherein the one or more processors operate to:

cause the display to switch the display of the first operation screen to the display of the third operation screen in a case where the log out by the first user is determined to have been caused by the receipt of the log out operation, and prohibit the display from switching the display of the first operation screen to the display of the third operation screen in a case where the log out by the first user is determined to have been caused by the receipt of the authentication request from the second user.

15. The image processing apparatus according to claim 11, wherein the one or more processors operate to:

according to receipt of an authentication request for login from the second user, determine whether the first user is logged in to the image processing apparatus or not; and in a case where it is determined that the first user is logged in to the image processing apparatus, cause the first user to log out of the image processing apparatus.

16. The image processing apparatus according to claim 11, wherein the one or more processors operate to:

cause the display to display a login screen for accepting an input of login information from the user; and receive an authentication request for login from the user on a basis of operation by the user via the login screen.

17. The image processing apparatus according to claim 11, further comprising:

a scanner configured to generate image data by reading an image on a document; and a printer configured to print an image on paper on a basis of the image data generated by the scanner.

18. The image processing apparatus according to claim 17, further comprising:

an interface via which the image data generated by the scanner is transmitted outside of the image processing apparatus.

19. A method for controlling an image processing apparatus that stores first language information associated with a first user and second language information associated with a second user, the method comprising:

receiving an authentication request for login from the first user;

displaying a first operation screen using the first language information stored in association with the first user according to the login of the first user to the image processing apparatus;

causing the first user to log out of the image processing apparatus according to receipt of an authentication request for login from the second user while the first user is logging in to the image processing apparatus; and switching from the display of the first operation screen to a display of a second operation screen using the second language information stored in association with the second user according to the login of the second user to the image processing apparatus.

20. A non-transitory computer-readable storage medium storing at least one program for causing a computer to execute a method for controlling an image processing apparatus that stores first language information associated with a first user and second language information associated with a second user, the method comprising:

receiving an authentication request for login from the first user;

displaying a first operation screen using the first language information stored in association with the first user according to the login of the first user to the image processing apparatus;

causing the first user to log out of the image processing apparatus according to receipt of an authentication request for login from the second user while the first user is logging in to the image processing apparatus; and switching from the display of the first operation screen to a display of a second operation screen using the second language information stored in association with the second user according to the login of the second user to the image processing apparatus.

* * * * *